(12) United States Patent
Rubin et al.

(10) Patent No.: US 11,567,331 B2
(45) Date of Patent: Jan. 31, 2023

(54) OPTICAL SYSTEM AND METHOD FOR IMPROVEMENT OF LIGHT FIELD UNIFORMITY

(71) Applicant: Lumus Ltd., Ness Ziona (IL)

(72) Inventors: Yuval Rubin, Ness Ziona (IL); Elad Sharlin, Mishmar David (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/683,507

(22) Filed: Mar. 1, 2022

(65) Prior Publication Data

US 2022/0187608 A1 Jun. 16, 2022

Related U.S. Application Data

(63) Continuation of application No. 17/044,418, filed as application No. PCT/IB2019/054230 on May 22, 2019, now Pat. No. 11,262,587.

(30) Foreign Application Priority Data

May 22, 2018 (IL) .......................................... 259518

(51) Int. Cl.
 *G02B 27/01* (2006.01)
 *G06T 3/40* (2006.01)
 *G06T 19/00* (2011.01)

(52) U.S. Cl.
 CPC ............ *G02B 27/0172* (2013.01); *G06T 3/40* (2013.01); *G06T 19/006* (2013.01);
 (Continued)

(58) Field of Classification Search
 CPC ............ G02B 27/0172; G02B 27/0081; G02B 27/0093; G02B 2027/011;
 (Continued)

(56) References Cited

U.S. PATENT DOCUMENTS 4,720,189 A 1/1988 Heynen et al.
4,932,743 A 6/1990 Isobe et al.
(Continued)

FOREIGN PATENT DOCUMENTS

JP H04159503 6/1992
JP 2004145330 5/2004
(Continued)

OTHER PUBLICATIONS

Charles B. Owen et all; "Display-Relative Calibration for Optical See-Through Head-Mounted Displays"; Proceedings of the Third IEEE and ACM International Symposium on Mixed and Augmented Reality, Nov. 2-5, Arlington,VA, USA, IEEE, Piscataway, NJ, USA, Nov. 2, 2004 (Nov. 2, 2004), pp. 70-78,XP058382672.

*Primary Examiner* — Brent D Castiaux
(74) *Attorney, Agent, or Firm* — Mark M. Friedman (57) ABSTRACT

A display device (10) for producing images to be viewed by an observer includes an optical system (14) and a control unit (20). The optical system receives input light indicative of an image into a light propagation channel (14A) and produces, at an exit pupil (14B), output light having a field of view (FOV) corresponding to the image to be presented to the observer (18). The light propagation channel has an intensity transfer function map $I_1(x,\varphi)$ of the optical system across a lateral dimension x of the exit pupil and an angular span $\varphi$ of the FOV. The control unit (20) modifies the image data which is to be input in the optical system by applying thereto intensity modulation based on a correction intensity map that at least partially compensates intensity non-uniformity in the intensity transfer function map $I_1(x,\varphi)$ of the optical system, such that the light output at the exit pupil of the optical system and indicative of the image, has a modulated intensity map which is observed by the viewer with improved intensity uniformity.

18 Claims, 6 Drawing Sheets

(52) U.S. Cl.
CPC .. *G02B 2027/011* (2013.01); *G02B 2027/014* (2013.01); *G02B 2027/0125* (2013.01)

(58) Field of Classification Search
CPC ...... G02B 2027/0125; G02B 2027/014; G02B 2027/0118; G02B 6/00; G06T 3/40; G06T 19/006
See application file for complete search history.

(56) References Cited

U.S. PATENT DOCUMENTS

| | | | |
|---|---|---|---|
| 5,208,800 | A | 5/1993 | Isobe et al. |
| 5,235,589 | A | 8/1993 | Yokomori et al. |
| 5,745,199 | A | 4/1998 | Suzuki et al. |
| 5,999,836 | A | 12/1999 | Nelson |
| 6,021,239 | A | 2/2000 | Minami et al. |
| 6,185,015 | B1 | 2/2001 | Silviu |
| 6,264,328 | B1 | 7/2001 | Williams |
| 6,927,694 | B1 | 9/2005 | Smith et al. |
| 7,857,444 | B2 | 12/2010 | Moliton |
| 7,949,252 | B1 | 5/2011 | Georgiev |
| 9,348,143 | B2 | 5/2016 | Gao et al. |
| 9,513,479 | B2 | 12/2016 | Akira et al. |
| 9,606,354 | B2 | 3/2017 | Spitzer et al. |
| 9,625,723 | B2 | 4/2017 | Lou et al. |
| 9,740,006 | B2 | 8/2017 | Gao |
| 9,927,614 | B2 | 3/2018 | Vallius |
| 10,007,115 | B2 | 6/2018 | Greenhalgh |
| 10,126,568 | B2 | 11/2018 | Rousseau et al. |
| 10,139,636 | B2 | 11/2018 | Lebrun |
| 10,198,865 | B2 | 2/2019 | Kezele et al. |
| 10,247,962 | B2 | 4/2019 | Rousseau et al. |
| 10,326,983 | B2 | 6/2019 | Hua |
| 10,345,903 | B2 | 9/2019 | Robbins et al. |
| 10,409,064 | B2 | 9/2019 | Lee |
| 10,416,452 | B2 | 9/2019 | Cheng et al. |
| 10,444,481 | B2 | 10/2019 | Takahashi |
| 10,852,549 | B2 | 12/2020 | Rousseau |
| 11,175,518 | B2 | 11/2021 | Zimanyi |
| 11,202,563 | B2 | 12/2021 | Zimmany |
| 2001/0000124 | A1 | 4/2001 | Kolin et al. |
| 2002/0097762 | A1 | 7/2002 | Yoshimura et al. |
| 2003/0169504 | A1 | 9/2003 | Kaminsky et al. |
| 2005/0012842 | A1 | 1/2005 | Miyagawa et al. |
| 2005/0073577 | A1 | 4/2005 | Sudo |
| 2005/0225866 | A1 | 10/2005 | Ageel et al. |
| 2006/0146518 | A1 | 7/2006 | Dubin |
| 2006/0153518 | A1 | 7/2006 | Ageel |
| 2007/0035707 | A1 | 2/2007 | Margulis |
| 2007/0070859 | A1 | 3/2007 | Hirayama |
| 2007/0165192 | A1* | 7/2007 | Prior .................... G02B 17/006 348/E5.143 |
| 2007/0273611 | A1 | 11/2007 | Torch |
| 2008/0259429 | A1 | 10/2008 | Kamm et al. |
| 2010/0027289 | A1 | 2/2010 | Aiki et al. |
| 2010/0201128 | A1 | 8/2010 | Saccomammo |
| 2011/0242661 | A1 | 10/2011 | Simmonds |
| 2012/0062998 | A1 | 3/2012 | Schultz et al. |
| 2012/0120498 | A1 | 5/2012 | Harrison et al. |
| 2012/0127062 | A1 | 5/2012 | Bar Zeev et al. |
| 2013/0002122 | A1 | 1/2013 | Bell |
| 2013/0021226 | A1 | 1/2013 | Bell |
| 2013/0022316 | A1 | 1/2013 | Pelletier |
| 2013/0007704 | A1 | 3/2013 | Bohn |
| 2013/0094712 | A1 | 4/2013 | Said |
| 2013/0012022 | A1 | 5/2013 | Cajigas et al. |
| 2013/0120224 | A1 | 5/2013 | Cajigas et al. |
| 2014/0016051 | A1 | 1/2014 | Kroll |
| 2014/0104665 | A1 | 4/2014 | Popovitch |
| 2014/0014065 | A1 | 5/2014 | Brown et al. |
| 2015/0207990 | A1 | 7/2015 | Ford |
| 2015/0331546 | A1 | 11/2015 | Craven-Bartle et al. |
| 2016/0018639 | A1 | 1/2016 | Spitzer |
| 2016/0020965 | A1 | 7/2016 | Popovich et al. |
| 2016/0198949 | A1 | 7/2016 | Spitzer |
| 2016/0313567 | A1 | 10/2016 | Kurashige |
| 2016/0314564 | A1* | 10/2016 | Jones ...................... G06T 5/006 |
| 2017/0003504 | A1* | 1/2017 | Vallius ............... G02B 27/4205 |
| 2017/0122725 | A1 | 5/2017 | Yeoh |
| 2017/0242249 | A1 | 8/2017 | Wall et al. |
| 2017/0276947 | A1 | 9/2017 | Yokoyama |
| 2018/0101087 | A1 | 4/2018 | Shinohara |
| 2018/0267295 | A1 | 9/2018 | Dalrymple et al. |
| 2018/0372940 | A1 | 12/2018 | Ishii et al. |
| 2019/0008667 | A1 | 1/2019 | Longo |
| 2019/0018247 | A1 | 1/2019 | Gao et al. |
| 2019/0086674 | A1 | 3/2019 | Sinay et al. |
| 2019/0187482 | A1 | 6/2019 | Lanman |
| 2020/0159030 | A1 | 5/2020 | Ayres et al. |

FOREIGN PATENT DOCUMENTS

| | | |
|---|---|---|
| JP | 2004233909 | 8/2004 |
| JP | 2006201637 | 8/2006 |
| JP | 2008053517 | 3/2008 |
| JP | 2010044172 | 2/2010 |
| JP | 2012058404 | 3/2012 |
| JP | 2012198263 | 10/2012 |
| JP | 2016033867 | 3/2016 |

* cited by examiner

OPTICAL SYSTEM AND METHOD FOR IMPROVEMENT OF LIGHT FIELD UNIFORMITY

CROSS-REFERENCE TO RELATED APPLICATIONS

This application is a continuation of U.S. patent application Ser. No. 17/044,418, filed Oct. 1, 2020, now U.S. Pat. No. 11,262,587, issued on Mar. 1, 2022, the disclosure of which is incorporated by reference in its entirety herein.

TECHNOLOGICAL FIELD

The present invention is generally in the field of optical techniques for improving light field uniformity within a field of view of the optical system. The invention is particularly useful in near-eye displays for displaying virtual images, based on lightguide couplers.

BACKGROUND

The main physical principle of the operation of a light-guide coupler used in near-eye displays (NEDs) is that light waves, indicative of a virtual image, are trapped inside a substrate by total internal reflections from the major surfaces of the substrate, and are coupled out into the eyes of the viewer by one or more (internal) at least partially reflecting or diffracting surfaces. One of the important factors defining the performance of the NED is associated with a requirement for uniformity of illumination formed by light output from the lightguide coupler. The non-uniformities, or irregularities, are intrinsic to the lightguide based NEDs, regardless of the physics of the coupling-out. The irregularities can look like fringes, or bands of lower/higher intensity over the image, with angular frequencies lay roughly in a range between ¼ of the field of view (FOV) and FOV/100. In light-guide architectures that address colors independently, these appear as color variations across the scene.

Various techniques have been developed to improve the uniformity of illumination, and are described for example in U.S. Pat. Nos. 6,829,095, 7,724,442, 8,004,765, 9,551,874, and WO16132347, all assigned to the applicant of the present application.

As described above, uniformity of illumination/brightness across the field of view of the system output is an important requirement for the system performance, and especially for a display devices including a virtual imaging system. The above mentioned earlier techniques solved this problem by utilizing coatings on various surfaces along the light propagation path averaging up the brightness of the dark and light areas of the image.

Yet another technique developed by the inventor of the present application is described in a recently filed International Patent Application No. PCT/IL2018/050010. According to this technique, a masking optical element is used which is optically coupled to an output of an optical unit, which produces light of non-uniform intensity profile across the field of view of the optical unit. The masking element is configured with a spatially varying transmission profile across the element in accordance with the non-uniform intensity profile, such that light interaction with (e.g. passage through) the masking element affects regions of relatively high light intensity within the intensity profile to apply intensity modulation to light passing through the masking optical element and improve the light intensity uniformity.

The present invention provides a novel approach for improving intensity/brightness uniformity of an image produced by the system as observed by a viewer. The invention is particularly useful for optical systems of the kind utilizing a light-guiding optical element (LOE) for guiding light propagation therethrough. Such LOE is used in near-eye display devices for projecting a virtual image. The LOE is configured for guiding virtual-image light propagation through the LOE by total internal reflection from mayor surfaces thereof, and may include one or more light directing surfaces (e.g. at least partially reflective surfaces) embedded therein for directing the virtual-image light towards one or more output directions.

According to the present invention, the illumination uniformity profile of an image as observed by a viewer is improved (i.e., the image at an eye pupil of the viewer) by applying intensity modulation to an image-carrying optical field which is to be input to the optical system, via the entry pupil of the optical system. The input field intensity modulation is applied electronically (e.g. via operation of a spatial light modulator), which may be performed concurrently with the creation of the image data to be input into the optical system or is applied to the previously created image data prior to be input in the optical system.

According to the invention, data about the optical system is provided, i.e. measured, or simulated based on the known configuration of a light propagation channel defined by the optical system. Such data about the optical system includes a characterizing intensity transfer function map $I_1(x,\phi)$ across a lateral dimension x of an exit pupil of the optical system and an angular span $\phi$ of a field of view (FOV) corresponding to an image to be presented to the viewer by the optical system. In other words, the optical system has its characteristic intensity profile in an angular-spatial space. This data is analyzed to properly affect the image data which is to be input in the optical system, such that the image being displayed is viewed by observer with improved intensity uniformity.

Thus, according to one broad aspect of the invention, there is provided a display device for producing images to be viewed by an observer. The display device comprises an optical system, and a control unit. The optical system comprises a light propagation channel having an exit pupil, and is configured and operable to receive input light indicative of an image and produce, at the exit pupil, output light having a field of view (FOV) corresponding to the image to be presented to the observer, while configuration of the light propagation channel defines a characterizing intensity transfer function map $I_1(x,\phi)$ of the optical system across a lateral dimension x of the exit pupil and an angular span $\phi$ of the FOV. The control unit is configured and operable to affect the image data which is to be input in the optical system by applying thereto intensity modulation based on a correction intensity map configured to at least partially compensate intensity non-uniformity in the characterizing intensity transfer function map $I_1(x,\phi)$ of the optical system, such that the light output at the exit pupil of the optical system and indicative of the image, has a modulated intensity map which is observed by the viewer with improved intensity uniformity.

In some embodiments, the control unit includes an intensity map generator module which is configured and operable to analyze the characterizing intensity transfer function map $I_1(x,\phi)$ of the optical system and predetermined eye pupil related data, to determine a corresponding intensity transfer function map indicative of angular intensity transfer from the exit pupil to the eye pupil, and generate the correction intensity map. The correction intensity map is analyzed by an intensity map modulator utility which utilizes the correction intensity map to generate corresponding intensity modulation and apply this intensity modulation to the image data being input to the optical system. The intensity modulation applied to the image is applied as an inversion of data indicative of at least a portion of the correction intensity map.

The predetermined eye pupil related data comprises data indicative of eye pupil dimension x' (either given or measured for a specific observer), and/or data indicative of a distance z between the exit pupil and the eye pupil (which might be fixed for a specific head mounted near-eye display device) or measured during the use of the device, and also data indicative of a lateral offset (x'−x) between the exit pupil and the eye pupil.

In some embodiments, the intensity map generator module comprises an integrator module configured to convolve the characterizing intensity transfer function map $I_1(x,\phi)$ over a predetermined eye pupil dimension x' and a predetermined lateral offset (x'−x) between the exit pupil and the eye pupil to obtain data indicative of convolved intensity transfer function map $I'_1((x'-x),\phi)$ indicative of angular intensity transfer from the exit pupil to the predetermined eye pupil dimension x'.

As indicated above, the control unit may utilize given data indicative of the eye pupil dimension x'.

In some embodiments, the data indicative of the convolved intensity transfer function map $I'_1((x'x), \phi)$ includes a plurality of convolved intensity transfer function maps corresponding to different pupil extents x'.

The intensity map generator module may include a selector module/utility configured and operable to utilize data indicative of a distance z between the exit pupil and the eye pupil and a lateral offset (x'−x) between the exit and eye pupils, and analyze the convolved intensity transfer function map $I_1((x'-x), \phi)$ to identify, in the convolved intensity transfer function map $I'_1((x'-x), \phi)$, a region corresponding to the specific distance z and offset (x−x') values, and generate the correction intensity map.

The intensity map modulator utility is configured to generate the intensity modulation as an inversion of the selected region of the convolved intensity transfer function map $I'_1((x'-x), \phi)$.

As indicated above, one or more parameters of the eye pupil related data may be measured during the image display sessions. To this end, the system includes an eye position controller configured and operable to monitor one or more parameters of the eye pupil of the observer, and determine the eye pupil related data, to thereby enable the control unit to dynamically adjust the correction intensity map.

As also indicated above, in some embodiments, the display device according to the invention is configured as a near-eye display device for displaying virtual images, or through-see display device to additionally and concurrently displaying real scene images. The optical system of such near-eye display device may include a light-guiding optical element (LOE) comprising a waveguide configured for guiding light propagation therethrough by total internal reflections from major surfaces of the waveguide and comprising one or more light directing surfaces embedded in the waveguide and arranged to define the exit pupil for directing light out of the waveguide.

In some embodiments, the control unit is configured to communicate with a storage device to receive the data indicative of the characterizing intensity transfer function map of the optical system. Alternatively or additionally, the control unit may include a simulator module configured and operable to receive data indicative of the configuration of the light propagation channel of the optical system and determine simulated data comprising the data indicative of the characterizing intensity transfer function map of the optical system.

According to another broad aspects of the invention, it provides a control system for controlling illumination uniformity of an image observed by a viewer from a display device having an optical system. The control system is configured as a computer system comprising a data processor and analyzer which comprises an intensity map generator module, and an intensity map modulator utility in data communication with the intensity map generator module. The intensity map generator module is configured and operable to receive and analyze input data comprising viewer's eye pupil related data and characterizing intensity transfer function map $I_1(x,\phi)$ of the optical system across a lateral dimension x of an exit pupil of the optical system and an angular span $\phi$ of a field of view (FOV) corresponding to an image to be presented to the viewer by the optical system. The intensity map generator module determines a corresponding intensity transfer function map indicative of angular intensity transfer from the exit pupil to the eye pupil, and generates a correction intensity map. The intensity map modulator utility is configured and operable to utilize the correction intensity map and generate corresponding intensity modulation to be applied to image data being input to the optical system to affect the image data to at least partially compensate intensity non-uniformity in the characterizing intensity transfer function map of the optical system, to provide that output light at the exit pupil of the optical system, which is indicative of the image, has a modulated intensity map observed by the viewer with improved intensity uniformity.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
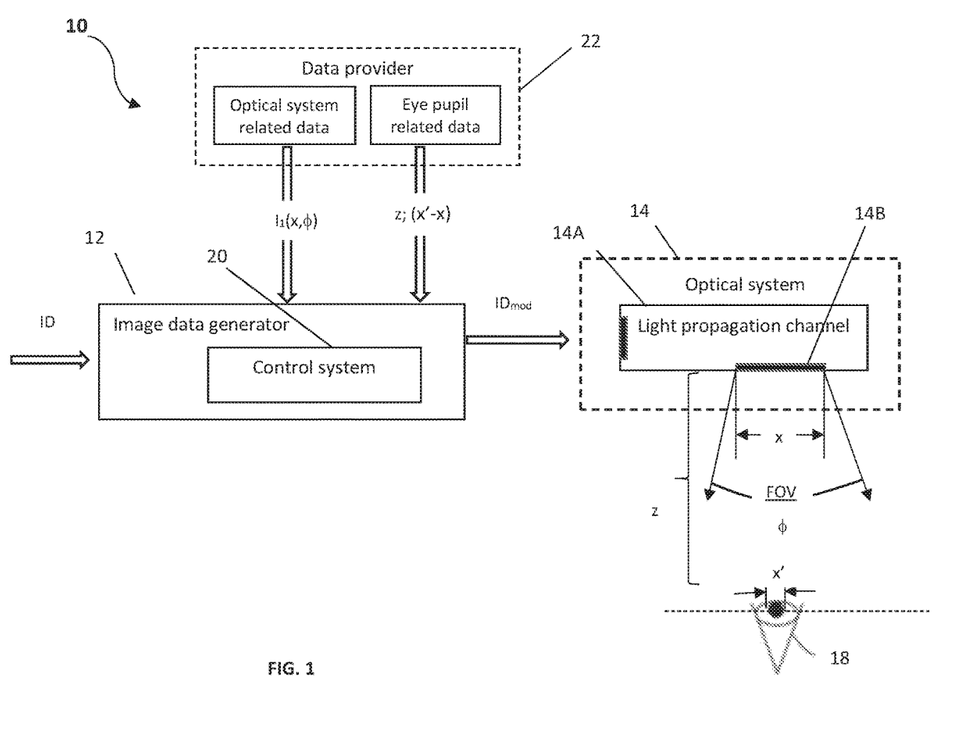
FIG. 1 is a block diagram of a display device, configured according to the is the invention, for displaying images to be viewed by an observer.

Reference is made to FIG. 1 illustrating, by way of a block diagram a display device 10 of the present invention. The display device 10 includes an optical system 14 associated with an image data generator 12. The latter is configured an operable to receive image data from an image data provider and generate corresponding optical field (structured light with light intensity map). This can be implemented by using a spatial light modulator, e.g. LCD-based modulator, or generally a matrix of light sources (e.g. OLED).

The optical system 14 includes one or more optical elements (now shown) defining a light propagation channel 14A for guiding the structured light, corresponding to the image to be displayed, through the light propagation channel 14A towards an exit pupil 141 with a field of view (FOV) which corresponds to the image of the optical system to be presented to/viewed by the viewer/observer's eye 18. The configuration of the light propagation channel 14A defines a characterizing intensity transfer function map $I_1(x,\phi)$ of the optical system across a lateral dimension x of the exit pupil 14B and an angular span $\phi$ of the FOV.

Further provided in the display device 10 is a control unit 20 configured and operable according to the invention to control illumination/intensity uniformity of the image as observed by the viewer. It should be understood that the present invention is aimed at improving the intensity profile of the image as observed by the viewer, namely at the eye pupil 18. This will be described more specifically further below.

The control unit 20 may be part of the image data generator 12 or a separate unit. The control unit 20 receives image data ID indicative of light intensity map which is to be input to the optical system and affects this image data by applying intensity modulation thereto to generate intensity modulated image data $ID_{mod}$. This intensity modulated image data $ID_{mod}$ is transformed into corresponding optical field (structured light), by any suitable known configuration of spatial light modulator (SLM), e.g. LCD-based modulator, to propagate through the optical system 14.

The intensity modulation applied by the control unit 20 is based on a correction intensity map which is determined by the control unit and is configured to at least partially compensate intensity non-uniformity in the characterizing intensity transfer function map $I_1(x, \phi)$ of the optical system, such that the image-carrying output light at the exit pupil 14B of the optical system 14 has a modulated intensity map $I_{mod}$ which is observed by the viewer with improved intensity uniformity.

As exemplified in the figure, the control unit 20 receives input data (e.g. accesses a storage device where such data is stored), from a data provider 22 (e.g. storage device), including data indicative of the characterizing intensity transfer function map $I_1(x, \phi)$ of the optical system. It should, however, be noted that the data indicative of the characterizing intensity transfer function map $I_1(x, \phi)$ may include such map data itself previously created (e.g. simulated or measured) and stored in the storage device; or such data indicative of characterizing intensity transfer function map $I_1(x, \phi)$ may include data about the configuration of the light propagation channel of the given optical system. In the latter case, the control unit 20 includes a simulator module configured and operable to analyze the configuration of the light propagation channel and determine simulated data characterizing intensity transfer function map $I_1(x,\phi)$ of the optical system. This will also be described further below.

As also shown in the figure, the control unit 20 also could utilize eye pupil related data in order to generate the intensity modulated image data $ID_{mod}$. Such eye pupil related data includes one or more of such parameters as a lateral dimension x' of the eye pupil, a distance z between the exit pupil 14B and the eye pupil 18, and a lateral offset (x'-x) between the exit pupil 14B and the eye pupil 18.

In some embodiments, one or more of these parameters may be given, i.e. of the typical values (e.g. lateral dimension x' of the eye pupil is typically of about 3 mm); values for the distance z and lateral offset (x'-x) between the exit pupil 14B and the eye pupil 18 may be almost fixed in case the position of the display device with respect to the viewer is fixed, such as in case of head mounted display device.

In some other embodiments, as will be described further below, the display device may alternatively or additionally include an eye pupil controller equipped with appropriate eye tracker that monitors/measures changes in the distance z and/or lateral offset (x'-x) values during image displaying sessions, and generates respective data, to which the control unit is responsive to dynamically adjust/update the intensity modulated image data $ID_{mod}$. The eye pupil controller may also include a measurement unit to measure the viewer's eye pupil size x'.

The optical system of the invention or at least a part thereof (e.g. light guiding element) can be of a very compact configuration, and can be used with a head-up display (HUD), being mounted on HUD or being a separate module. Another possible application of the present invention is as a part of a smart phone, which would be installed with a predetermined software application. An examples of such configurations, e.g. a hand-held light guiding element connectable to the HUD, etc. are described in U.S. Pat. No. 8,004,765 assigned to the assignee of the present application.

Figure 2:
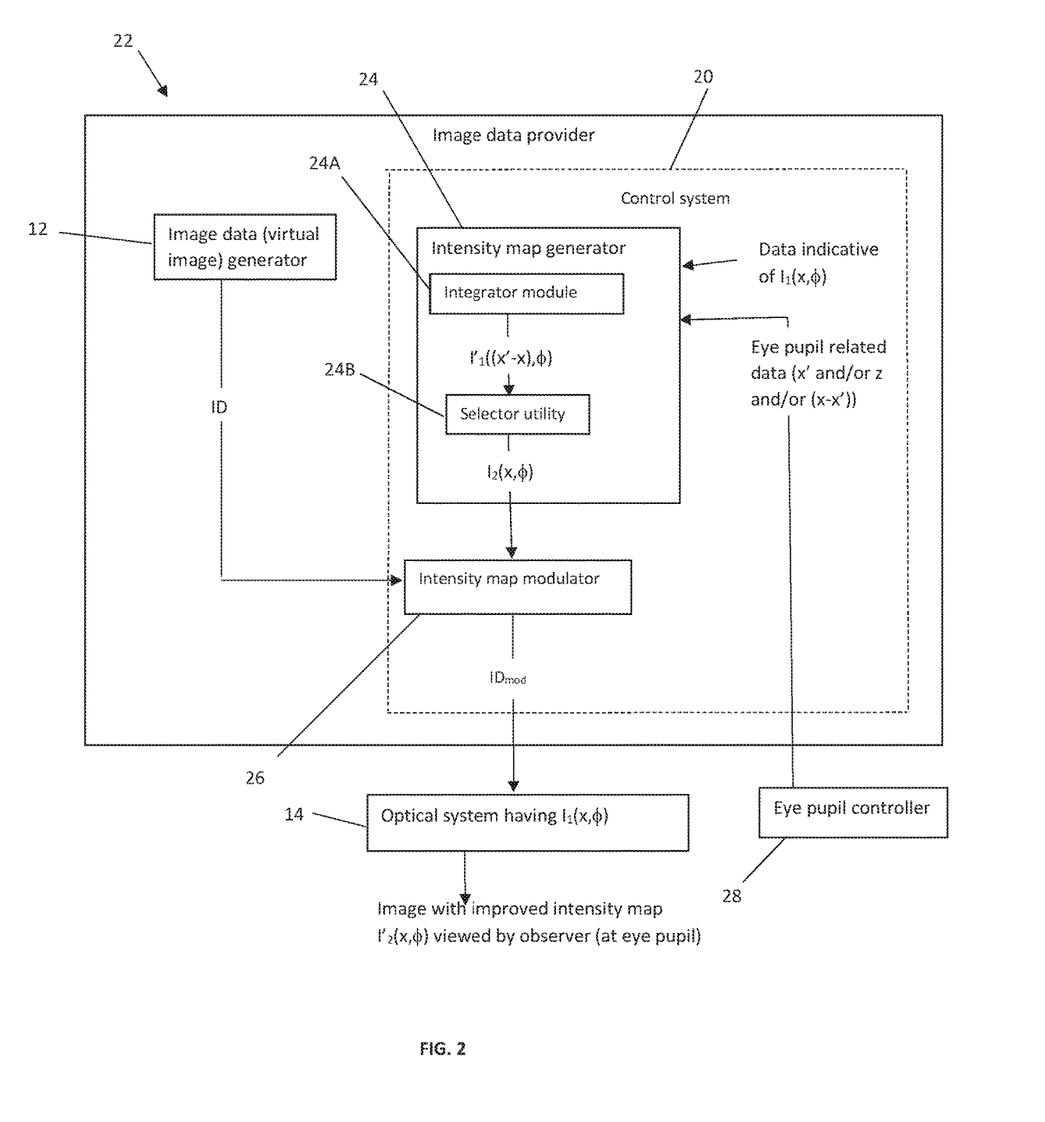
FIG. 2 is a block diagram of the configuration of a control system of the invention for use in the system of FIG. 1 to control illumination uniformity of an image being displayed, as observed by a viewer.

FIG. 2 shows a block diagram of the configuration of an exemplary control unit 20. The control unit 20 includes data input and output utilities and a memory, which are not specifically shown. The control unit 20 may be part of the image data provider 22 or may be a separate unit/circuit 20 configured to be in data communication with the image data generator 12 which is in turn a part of or connectable to the image data provider 22.

The control unit 20 includes an intensity map generator module 24 which is configured and operable to analyze data indicative of the characterizing intensity transfer function map $I_1(x,\phi)$ of the optical system (e.g. given or simulated) and viewer's eye pupil related data, as described above, and determine corresponding intensity transfer function map indicative of angular intensity transfer from the exit pupil to the eye pupil, and generate a correction intensity map $I_2(x,\phi)$.

As exemplified in the figure, the intensity map generator module 24 includes an integrator module 24A which is configured to convolve the characterizing intensity transfer function map $I_1(x,\phi)$ over a predetermined eye pupil dimension x' and a predetermined lateral offset (x'-x) between the exit pupil and the eye pupil and obtain data indicative of convolved intensity transfer function map $I'_1((x'-x),\phi)$. Such convolved intensity transfer function map $I'_1(x'-x),\phi)$ is indicative of angular intensity transfer from the exit pupil 14B to the eye pupil 18 of the predetermined lateral dimension and relative location with respect to the exit pupil.

It should be noted that the case may be such that the data indicative of convolved intensity transfer function map $I'_1(x'-x),\phi)$ is prepared comprising a plurality of convolved intensity transfer function maps corresponding to different pupil extents x'. In this example, the intensity map generator module 24 further includes a selector module 24B which is configured and operable to utilize the data indicative of distance z between the exit pupil 14B and the eye pupil 18 and the lateral offset (x'-x) between the exit and eye pupils, to identify in the convolved intensity transfer function map $I'_1((x'-x),\phi)$ a region corresponding to the distance z and the offset (x−x') values, and generate the correction intensity map $I_2(x,\phi)$.

Also provided in the control unit 20 is an intensity map modulator utility 26 which receives image data ID (e.g. virtual image) from the image data generator 12, and receives the correction intensity map $I_2(x,\phi)$ from the intensity map generator module 24. The intensity map modulator utility 26 is configured and operable to analyze the correction intensity map $I_2(x,\phi)$ and generate corresponding intensity modulation and apply this modulation to the image data ID, to thereby produce the intensity modulated image data $ID_{mod}$. The intensity modulation is produced and applied to the image data ED for example as an inversion (or some approximation of inversion) of the correction intensity map, i.e. inversion of the selected region of the convolved intensity transfer function map $I'_1((x'-x),\phi)$.

The so-created intensity modulated image data $ID_{mod}$ is transformed into the corresponding light field (structured light) which enters the optical system 14 with the characterizing intensity transfer function map $I_1(x,\phi)$, to at least partially compensate intensity non-uniformity in the characterizing intensity transfer function map $I_1(x, \phi)$ of the optical system. As a result, output light at the exit pupil of the optical system, indicative of the original image, has a modulated intensity map, such that a corresponding image with improved intensity map $I'_2(x,\phi)$ is viewed by observer (at eye pupil).

Considering a display device used in virtual imaging systems, the display device typically includes an eye pupil controller (eye tracker) 28 which dynamically adjusts/updates one or more of the eye pupil related parameters (typically, distance z and lateral offset (x−x')). Accordingly, the control unit 20 (its intensity map generator 24) dynamically adjusts the correction intensity map $I_2(x,\phi)$.

Reference is now made to FIGS. 3A to 3E which exemplify the technique of the invention for controlling operation of an LOE-based optical system used in near-eye displays.

Figure 3A:
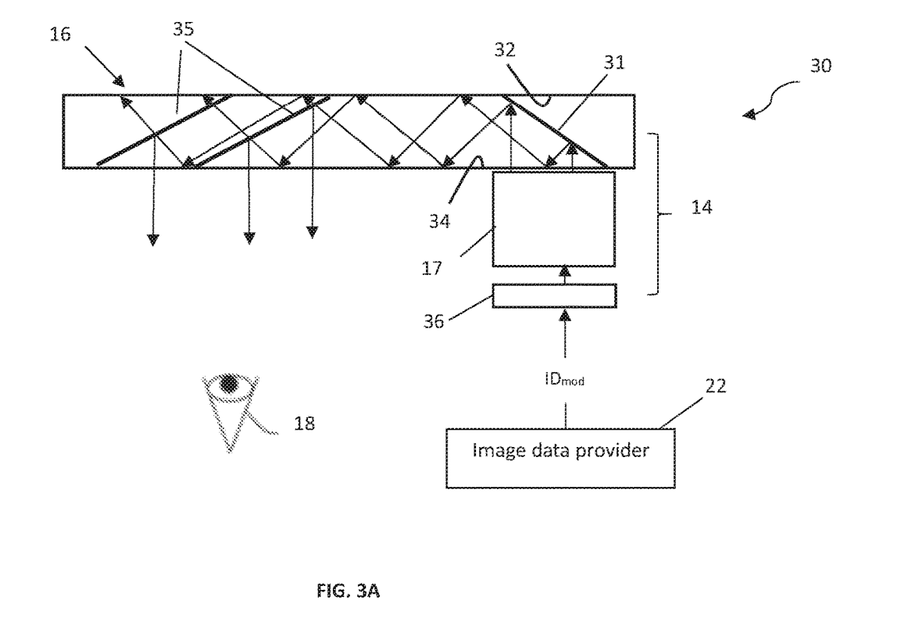
FIGS. 3A to 3D exemplify the technique of the invention for improving illumination uniformity in observing images being displayed by a near-eye display utilizing an LOE-based optical system.

FIG. 3A exemplifies a head up display device 30, which includes the optical system 14 utilizing an LOE 16 having major surfaces 32 and 34 and light directing elements 31 and 35 (at least partially reflective) embedded therein, and a collimating module 17, defining together a light propagation channel 14A through the optical system 14. As also shown in the figure, the display device 30 includes an image creation device 36 configured as described above (e.g. includes projector, e.g. SLM-based) to transform the image data into the corresponding image-carrying light. The image creation device is operated by the image data provider 22 (configured for example as described above) including or connectable to the control unit 20. As shown in the figure, image-carrying light passes through the collimating module 17, enters the LOE (waveguide/substrate) 16, is reflected from light directing element (reflector) 31 and is trapped in the substrate/body of the LOE, where the light is guided by total internal reflection from major surface 32 and 34 and successively interact with at least partially reflective elements 35 which couple the light out of the substrate to propagate towards a pupil 18 of viewer's eye.

The configuration and operation of such LOE-based optical system 14 are known per se and are exemplified in the above-mentioned earlier patent publications of the assignee of the present application. The configuration and operation of such optical system do not form part of the present invention, and therefore are not described here in details. As for the principles of using the configuration of the optical system to determine/simulate the characterizing intensity transfer function map $I_1(x,\phi)$ of the optical system, these are described more specifically further below.

Figure 3B:
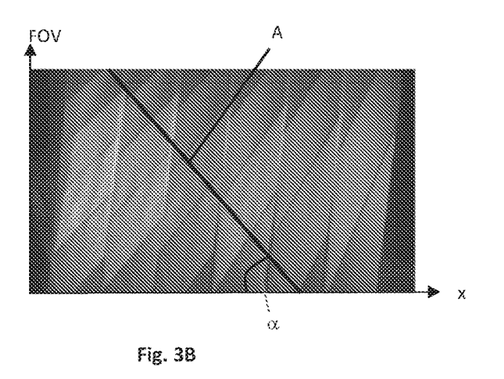

FIG. 3B exemplifies the characterizing intensity transfer function map $I_1(x,\phi)$ of the optical system across a lateral dimension x of the exit pupil and an angular span # of the FOV corresponding to the image to be presented to the observer, and also along distance z between the exit pupil and the eye pupil of the observer. Here, line A and its angular orientation a correspond to, respectively, the lateral dimension x' of the eye pupil and eye pupil position z with respect to the exit pupil of the optical system.

Figure 3C:
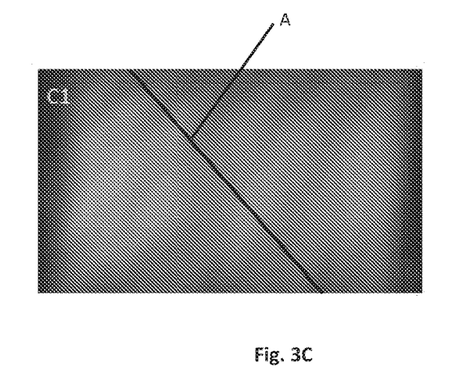

FIG. 3C shows the convolved intensity transfer function map $I'_1((x'-x),\phi)$, which is obtained by convolving the characterizing intensity transfer function map $I_1(x,\phi)$ of FIG. 3B over the predetermined eye pupil dimension x' and the predetermined lateral offset (x'−x) between the exit pupil and the eye pupil. Such convolved intensity transfer function map $I'_1((x'-x),\phi)$ is indicative of angular intensity transfer from the exit pupil to the predetermined eye pupil dimension x'.

Figure 3D:
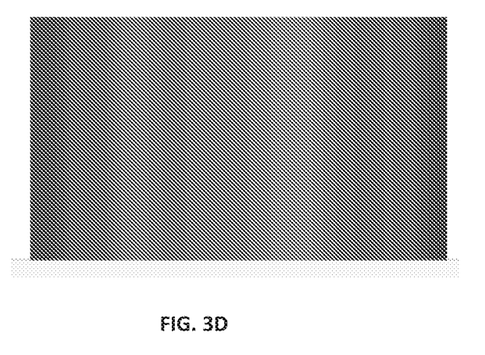

FIG. 3D shows the correction intensity map $I_2(x,\phi)$, which is obtained by utilizing distance z and lateral offset (x'−x) to extract from the convolved intensity transfer function map $I'_1((x'-x),\phi)$, a region corresponding to these distance z and offset (x−x') values.

As described above, the so-obtained correction intensity map $I_2(x,\phi)$ is then used to apply the intensity modulation to image data as an inversion of the correction intensity map $I_2(x,\phi)$ and operate the image creation device 36 (e.g. projector) accordingly.

Reference is made to FIGS. 4A-4C and 5A-5C which exemplify how the light scheme propagation through the exemplified LOE-based optical system affects the intensity map at the exit pupil of the optical system (i.e. of the LOE), which can be used to simulate the characterizing intensity transfer function map $I_1(x,\phi)$ of the optical system across a lateral dimension x of the exit pupil and an angular span of the FOX corresponding to the image to be presented to the observer. These figures illustrate the nature of dark-band effects and their representation in the angular-spatial space, i.e. in the intensity transfer function map $I_1(x,\phi)$ characterizing the specific optical system.

Figure 4A:
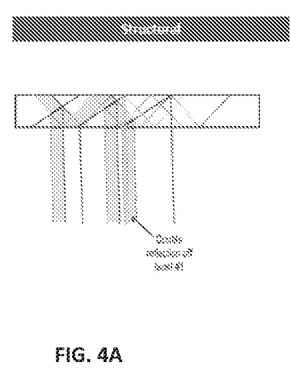
FIGS. 4A-4C and 5A-5C exemplify how the light scheme propagation through an exemplified LOE-based optical system affects the intensity map at the exit pupil of the LOE, which can be used to simulate the intensity map of the LOE-based optical system.
Figure 5A:
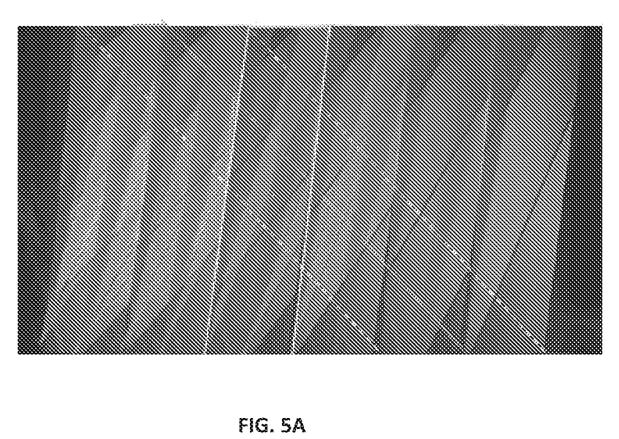

FIG. 4A shows the so-called "structural bands" associated effect: due to the difference in light interaction with light directing elements 30 for rays of entering the LOE with different angles, over the FOV, some rays undergo more attenuation than others. More specifically, structural bands are multiplied by each total internal reflection, as a result at a higher number of light directing element/facet (in the order of successively arranged facets in a general direction of light propagation through the LOE), e.g. at $3^{rd}$ facet, they add up resulting in a visually prominent band. This is shown in FIG. 5A.

Figure 4B:
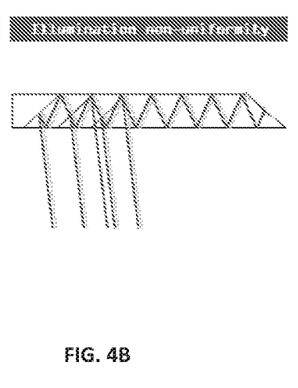
Figure 5B:
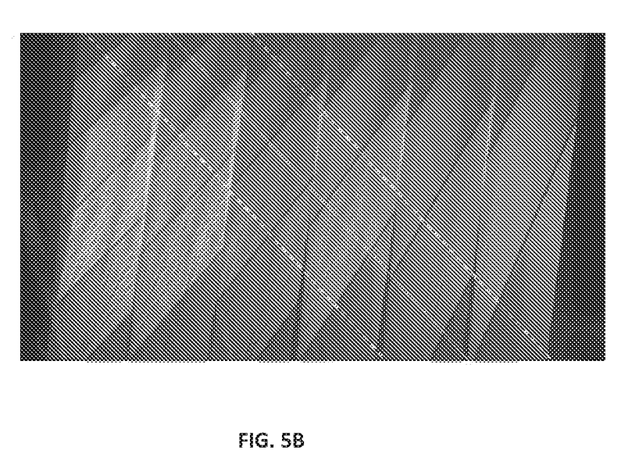

FIGS. 4B and 5B show the "illumination non-uniformity" related band: uneven illumination over the entrance pupil is replicated by the LOE and form periodic variations of brightness.

Figure 4C:
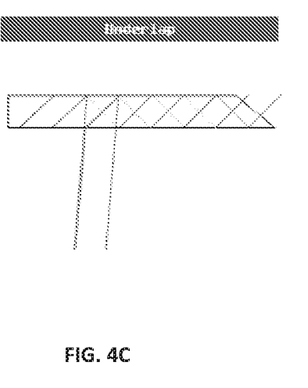
Figure 5C:
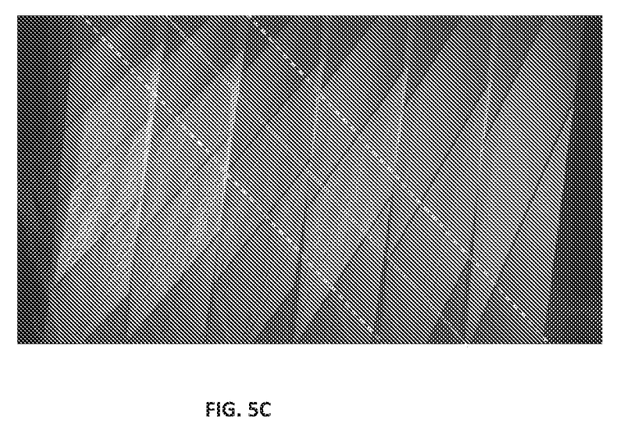

FIGS. 4C and 5C show a so-called "underlap bands effect": at lower angles there are thin areas that rays cannot fill, while at higher angles there are similar areas rays fill twice.

Thus, the characterizing intensity transfer function map $I_1(x,\phi)$ of the optical system can be used to determine the complete data about dark bands over the field of view, for any pupil lateral dimension and z distances. Using this data, the correction map can be determined, and the dark bands effects can be compensated electronically (with accuracy depending on eye position knowledge).

The technique of the invention can be used in addition to the above-described coating-based solution. For example, the inventor has found that for the LOE-based optical system, the most problematic dark bands effects appear at the center of pupil dimension/FOX map, and this can be improved/by proper coating design, while the to other effects can be compensated/improved electronically by the correction map as described above.

As also indicated above, the characterizing intensity transfer function map $I_1(x,\phi)$ of a given optical system may be measured. Such measurements can be implemented, for example, by scanning the exit pupil output using a line CCD. This is exemplified in FIG. 6, which shows the line CCD map, i.e. measured intensity profile in the angular-spatial space (across a lateral dimension x of the exit pupil, along distance z from the exit pupil, and an angular span φ of the FOV). The line profile is the intensity variation over the FOV across the pupil x, and the slope a corresponds to the eye relief or distance z.

Figure 6:
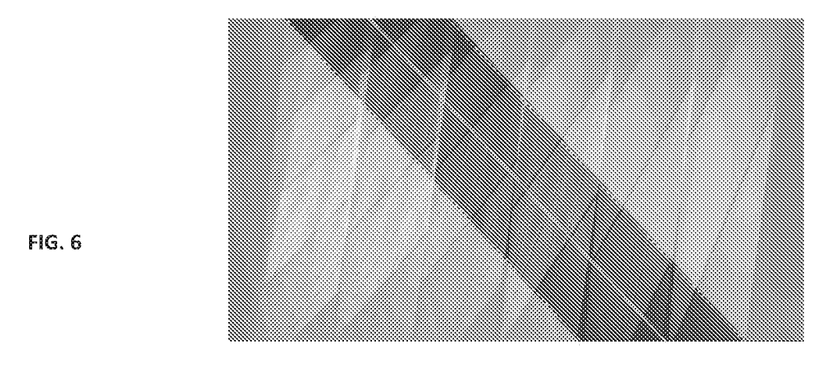
FIG. 6 exemplifies how a characterizing intensity transfer function map $I_1(x,\phi)$ of the optical system in the angular-spatial space can be measured using a line CCD scan.

Such map, either measured or simulated, contains all the intensity data for the eye relief (z distance), eye position (lateral offset) and the eye pupil diameter (lateral dimension). Therefore, this map, being the characterizing intensity transfer function map $I_1(x,\phi)$ of the optical system in the angular-spatial space, can be used to compensate (dynamically via eye tracker or statically) for the intensity non-uniformity sources (dark bands effects).

The invention claimed is:

1. A display device for displaying images to a viewer, the display device comprising:
   an optical system including:
      an image projecting arrangement that produces, based on input image data, light indicative of a collimated image to be displayed to the viewer, and
      a light-guiding optical element (LOE) having a pair of major surfaces that receives the light produced by the image projecting arrangement such that the light is guided through the LOE by internal reflection at the major surfaces, the LOE further including at least one partially reflective surface oblique to the major surfaces, the at least one partially reflective surface directing light out of the LOE to produce, at an exit pupil defined by the at least one partially reflective surface, output light having a field of view (FOV) corresponding to the collimated image, the LOE defining a characterizing intensity transfer function map $I_1(x,\phi)$ of the optical system across a lateral dimension x of the exit pupil and an angular span p of the FOV; and
   a control unit associated with the image projecting arrangement and including:
      an intensity map generator module that convolves data indicative of the characterizing intensity transfer function map $I_1(x,\varphi)$ over a predetermined dimension x' of the eye pupil of the viewer and a predetermined lateral offset x'-x between the exit pupil and the eye pupil to obtain data indicative of a convolved intensity transfer function map $I_1((x'-x),\phi)$ that is indicative of angular intensity transfer from the exit pupil to the predetermined dimension x' of the eye pupil, and generates a correction intensity map from the convolved intensity transfer function map $I'_1(x'-x),\phi)$, and
      an intensity map modulator that generates, based on the correction intensity map, corresponding intensity modulation to be applied to the input image data, the intensity modulation affecting the input image data to at least partially compensate intensity non-uniformity in the characterizing intensity transfer function map $I_1(x,\phi)$ such that the output light at the exit pupil has a modulated intensity map observed by the viewer with improved intensity uniformity.

2. The display device of claim 1, wherein the control unit is provided with eye pupil related data that includes data indicative of the predetermined dimension x' of the eye pupil.

3. The display device of claim 2, wherein the predetermined eye pupil related data further includes data indicative of a distance z between the exit pupil and the eye pupil and the lateral offset x'-x between the exit pupil and the eye pupil.

4. The display device of claim 2, wherein the data indicative of the predetermined dimension x' of the eye pupil is given data.

5. The display device of claim 2, wherein the data indicative of the predetermined dimension x' of the eye pupil is measured for a specific viewer.

6. The display device of claim 1, wherein the data indicative of convolved intensity transfer function map $I'_1((x'-x),\varphi)$ comprises a plurality of convolved intensity transfer function maps corresponding to different pupil extents x'.

7. The display device of claim 1, wherein the intensity map generator module includes a selector module configured to:
   receive data indicative of a distance z between the exit pupil and the eye pupil and the lateral offset x'-x between the exit pupil and the eye pupil, and
   generate the correction intensity map from the convolved intensity transfer function map $I'_1((x'-x),\varphi)$ by analyzing the data indicative of the convolved intensity transfer function map $I'_1((x'-x),\varphi)$ to identify in the convolved intensity transfer function map $I'_1((x'-x),\phi)$ a region corresponding to the distance z between the exit pupil and the eye pupil and the lateral offset x'-x between the exit pupil and the eye pupil.

8. The display device of claim 7, wherein the intensity map modulator utility is configured to generate the intensity modulation as an inversion of the region identified in the convolved intensity transfer function map $I'_1((x'-x),\varphi)$.

9. The display device of claim 1, further comprising:
   an eye tracker device configured to:
      monitor one or more parameters of the eye pupil of the viewer during image displaying sessions so as to generate eye pupil related data that includes data indicative of the predetermined dimension x' of the eye pupil, and
      provide the generated eye pupil related data to the control unit such that the control unit dynamically adjust the correction intensity map.

10. The display device of claim 1, wherein the control unit is configured to communicate with a storage device to receive the data indicative of the characterizing intensity transfer function map $I_1(x,\varphi)$ of the optical system.

11. The display device of claim 1, wherein the control unit further includes:
   a simulator module configured to receive data indicative of a configuration of the LOB, and generate data indicative of the characterizing intensity transfer function map $I_1(x,\varphi)$ of the optical system based on the data indicative of the configuration of the LOB.

12. A display device for displaying images to a viewer, the display device comprising:
- an optical system including a light-guiding optical element (LOE) having a pair of major surfaces that receives light from an image projecting arrangement such that the light is guided through the LOE by internal reflection at the major surfaces, the light received from the image projecting arrangement being indicative of a collimated image to be displayed to the viewer and being produced by the image projecting arrangement from input image data, the LOE further including at least one partially reflective surface oblique to the major surfaces, the at least one partially reflective surface directing the guided light out of the LOE to produce, at an exit pupil defined by the at least one partially reflective surface, output light having a field of view (FOV) corresponding to the collimated image, the LOE defining a characterizing intensity transfer function map $I_1(x,\varphi)$ of the optical system across a lateral dimension x of the exit pupil and an angular span p of the FOV; and
- a control unit including:
  - an intensity map generator module that convolves data indicative of the characterizing intensity transfer function map $I_1(x,\phi)$ appears over a predetermined dimension x' of the eye pupil of the viewer and a predetermined lateral offset (x'-x) between the exit pupil and the eye pupil to obtain data indicative of a convolved intensity transfer function map $I'_1((x'-x),\varphi)$ that is indicative of angular intensity transfer from the exit pupil to the predetermined dimension x' of the eye pupil, and generates a correction intensity map from the convolved intensity transfer function map $I'_1((x'-x),\varphi)$, and
  - an intensity map modulator that generates, based on the correction intensity map, corresponding intensity modulation to be applied to the input image data, the intensity modulation affecting the image data to at least partially compensate intensity non-uniformity in the characterizing intensity transfer function map $I_1(x,\varphi)$ of the optical system such that the output light at the exit pupil has a modulated intensity map observed by the viewer with improved intensity uniformity.

13. The display device of claim 12, wherein the data indicative of convolved intensity transfer function map $I'_1((x'-x),\varphi)$ comprises a plurality of convolved intensity transfer function maps corresponding to different pupil extents x.

14. The display device of claim 12, wherein the intensity map generator module includes a selector module configured to:
- receive data indicative of a distance z between the exit pupil and the eye pupil and the lateral offset x'-x between the exit pupil and the eye pupil, and
- generate the correction intensity map from the convolved intensity transfer function map $I'_1((x'-x),\varphi)$ by analyzing the data indicative of the convolved intensity transfer function map $I'_1(x'-x),\varphi)$ to identify in the convolved intensity transfer function map $I'_1((x'-x),\varphi)$ a region corresponding to the distance z between the exit pupil and the eye pupil and the lateral offset x'-x between the exit pupil and the eye pupil.

15. The display device of claim 14, wherein the intensity map modulator utility is configured to generate the intensity modulation as an inversion of the region identified in the convolved intensity transfer function map $I'_1((x'-x),\varphi)$.

16. The display device of claim 12, further comprising:
- an eye tracker device configured to:
  - monitor one or more parameters of the eye pupil of the viewer during image displaying sessions so as to generate eye pupil related data that includes data indicative of the predetermined dimension x' of the eye pupil, and
  - provide the generated eye pupil related data to the control unit such that the control unit dynamically adjust the correction intensity map.

17. The display device of claim 12, wherein the control unit is configured to communicate with a storage device to receive the data indicative of the characterizing intensity transfer function map $I_1(x,\varphi)$ of the optical system.

18. The display device of claim 12, wherein the control unit further includes:
- a simulator module configured to receive data indicative of a configuration of the LOE, and generate data indicative of the characterizing intensity transfer function map $I_1(x,\varphi)$ of the optical system based on the data indicative of the configuration of the LOE.

* * * * *